United States Patent

[11] 3,602,890

[72] Inventor Robert W. Colpitts
East Palo Alto, Calif.

[21] Appl. No. 801,574
[22] Filed Feb. 24, 1969
[45] Patented Aug. 31, 1971
[73] Assignee Hewlett-Packard Company
Palo Alto, Calif.

[54] PEN CONTROL SYSTEM FOR AN AUTOMATIC X-Y PLOTTER
9 Claims, 12 Drawing Figs.

[52] U.S. Cl. .......... 340/172.5
[51] Int. Cl. .......... G05b 15/00
[50] Field of Search .......... 235/157, 151.11, 151; 340/172.5; 178/18, 19; 318/567, 569

[56] References Cited

UNITED STATES PATENTS

| | | | |
|---|---|---|---|
| 3,199,111 | 8/1965 | Jennings et al. | 340/172.5 X |
| 3,209,222 | 9/1965 | Holy | 340/172.5 X |
| 3,393,300 | 7/1968 | Jennings et al. | 340/172.5 X |
| 3,434,113 | 3/1969 | Wiley et al. | 340/172.5 |

*Primary Examiner*—Paul J. Henon
*Assistant Examiner*—Melvin B. Chapnick
*Attorney*—Stephen P. Fox

ABSTRACT: Digital data from a calculator is translated into signals for display by an X–Y graphic plotter. The plotter includes a pen that is selectively enabled by a control system which responds to first and second control signals from the calculator. Additionally, either control signal causes a block of data to be transferred from the calculator to the X–Y plotter. Three memory elements in combination with signal transmitting and inhibiting gates respond to the first and second control signals to condition the pen in a writing or a nonwriting mode, respectively. The plotter is operable to draw selected line segments having nonzero origin points, and to permit plotting of one block of data while the next block of data is being processed by the calculator. Additional circuitry is provided for manually stopping the X–Y plotter in the event that an X–Y graphical plot exceeds allowable dimensional limits. A stop signal causes the recording pen to immediately disable and return to the origin of the X–Y graph.

PATENTED AUG 31 1971 3,602,890

SHEET 1 OF 2

INVENTOR
ROBERT W. COLPITTS
BY [signature]
AGENT

INVENTOR
ROBERT W. COLPITTS
BY [signature]
AGENT

PEN CONTROL SYSTEM FOR AN AUTOMATIC X-Y PLOTTER

BACKGROUND OF THE INVENTION

In one type of data processing system, data may be graphically displayed by an X-Y recorder having a movable pen or writing stylus which is positionable in response to digital signals from a calculator. The X-Y recorder may be used to plot a mathematical function as a series of connected straight line segments, the first of which begins from a selected starting point on the graph. Oftentimes, the first point to be plotted is not coincident with the origin point of the X-Y coordinates from which the pen may begin tracing a line. In this case, the pen must be disabled while being moved to the first point to be plotted, and thereafter the pen must be enabled and remain enabled to drawn a series of connected line segments between successive points computed by the calculator. This type of operation has been achieved in prior art devices by computing the starting point with a program sequence which is separate from that used in computing subsequent points. As a result, two program sequences have been required, and they are substantially identical except for certain control instructions for the pen. The duplication of programs is obviously wasteful of storage space in the calculator and can result in severe limitations of data processing capability, especially where the calculator has only a small memory capacity and where the program sequences are lengthy.

One attempted method of avoiding the duplication of program steps and still achieving the pen control described above is to first compute a point to which a line segment is to be drawn, and thereafter produce the necessary control signals for enabling, disabling and/or moving the pen. A major disadvantage of this method is that the computation and pen control steps must be performed sequentially rather than simultaneously, and that computation and the next pen control signal cannot be performed until the pen has stopped moving. As a result, data processing time is wasted.

In view of the above-described problems and disadvantages, it is an object of the present invention to achieve economy of both computation time and memory space in a data system including a calculator and an X-Y recorder responsive thereto.

SUMMARY OF THE INVENTION

In accordance with the foregoing objective, the present invention relates to a system responsive to digital signals from a calculator for controlling an X-Y plotter so that a line segment graph of a computed function may begin at some point which is remote from the origin of the X-Y coordinates. The plotter control system obviates the need for one program for plotting line segments from the first point and a separate substantially duplicate program for plotting line segments from subsequent points. As a result, memory locations in the calculator may be conserved. In addition, the plotter control system permits movement and the selective enabling or disabling of the pen in response to one block of data at the same time that the next succeeding block of data is being processed by the calculator. Only two plot control signals are required to initiate movement of the pen and to condition the pen in a writing or a nonwriting mode.

The illustrated embodiment of the present invention includes means for causing a block of data to be transferred from the calculator to an X-Y pen position controlling circuit when either one of two plot control signals is produced by the calculator. A first flip-flop stores the particular plot control signal received. After the block of data has been transferred, the pen begins moving in response thereto. At this time, the pen may be either in a writing or a nonwriting mode, depending on the previous condition of the pen and on whether the particular one of the two plot control signals received by the first flip-flop was an enabling or a disabling signal. If an enabling signal was received, it is stored in a second flip-flop until the pen has stopped moving. Thereafter the second flip-flop sets a third flip-flop which in turn enables the pen in a writing mode. Alternatively, if the plot control signal received from the calculator is a disabling signal, the first flip-flop immediately resets the third flip-flop to condition the pen in a nonwriting mode. Inhibiting circuitry insures that the pen will not be enabled or disabled while it is moving.

There is also provided gating circuitry for resetting the first, second and third flip-flops and for zero-setting the X-Y pen position controlling means in response to a stop signal initiated by an operator. The effect of this circuitry is to disable the pen and return it to the origin of the X-Y coordinates. This feature permits an operator to stop the plotting of data in the event that it exceeds the dimensional limits of the X-Y coordinate system.

Figure 1:
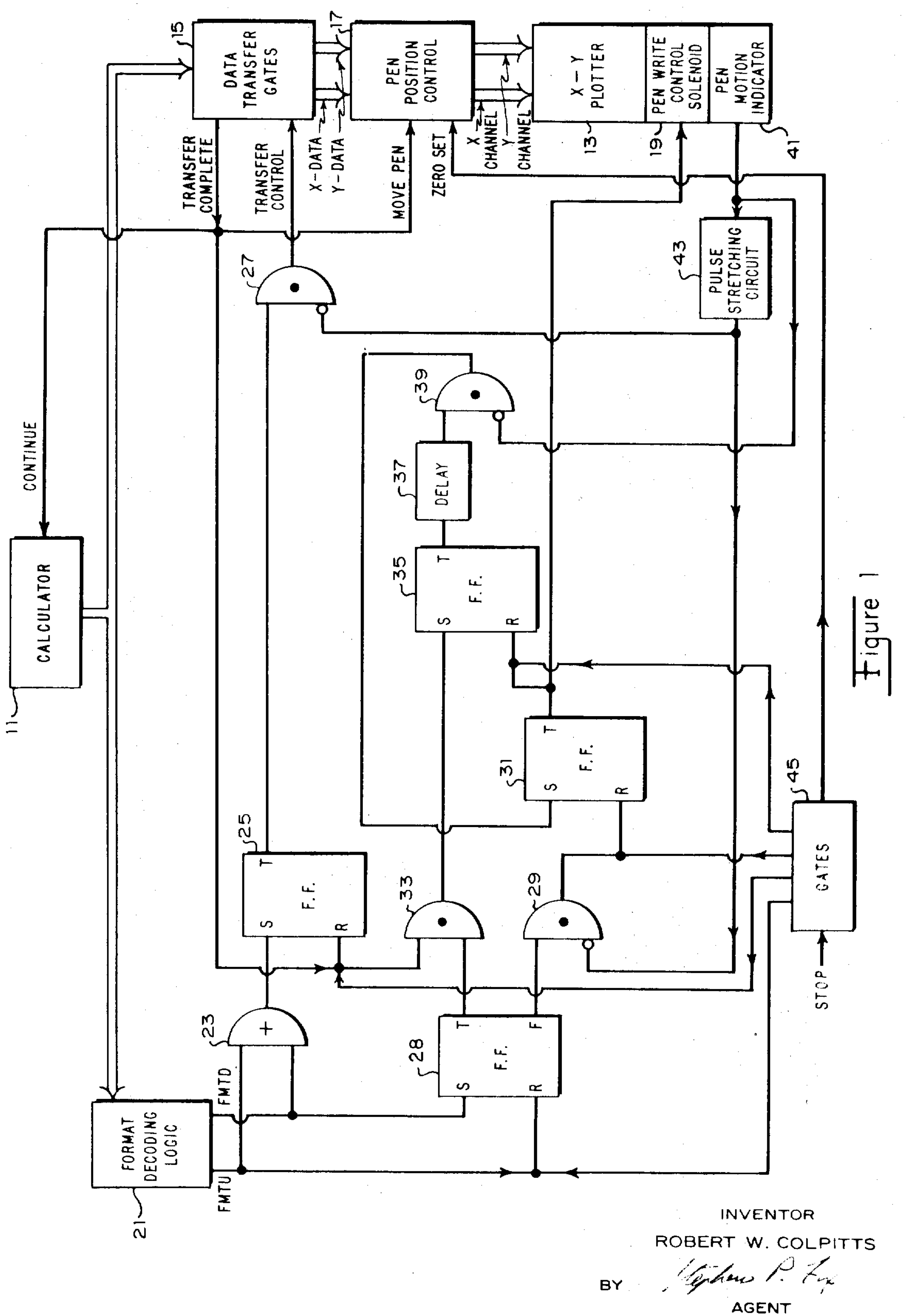
FIG. 1 is a block diagram incorporating the plot control system of the present invention.

FIGS. *2a–k* are timing diagrams illustrating the sequence and duration of operation of various components in the system of FIG. 1.

BRIEF DESCRIPTION OF THE PREFERRED EMBODIMENT

Referring now to FIG. 1, there is shown a cyclically operable digital calculator 11 and an X-Y recorder or plotter 13. The calculator 11 produces data representative of mathematical functions, for example, which are graphically displayed by the X-Y plotter 13. One type of calculator which may be used is the Model 9100A Calculator manufactured by the Hewlett-Packard Company, and described, for example, in the Hewlett-Packard Journal, Sept. 1968. Data from the calculator 11 is selectively gated by the data transfer gates 15 to the X and Y data inputs of a pen position control circuit 17. The pen position control circuit 17 may include, for example, digital-to-analog converter circuitry which controls the X and Y movement of the pen of the X-Y plotter 13. The data transfer gates 15, pen position control circuitry 17 and X-Y plotter 13 and the coupling between them may be of conventional design, as shown for example in an article entitled "Unique Plotting System Turns Digits Into Curves," published in Control Engineering, Jan. 1961, pages 111–114. The pen is conditioned in a writing mode or a nonwriting mode by a pen write control solenoid 19, which is mechanically coupled to the pen, which when energized, the solenoid 19 lowers the pen tip into contact with the graph paper in the X-Y plotter 13.

In addition to the aforementioned digital data signals, the calculator 11 also produces two pen control signals which determine the writing status of the pen. These two signals are recognized by the pen format decoding logic 21, and are respectively designated format up (FMTU) and format down (FMTD). Decoding logic 21 may be a conventional diode gating circuit which produces logic signals on FMTU and FMTD output lines in response to the corresponding binary coded input signals from the calculator 11. The two signals operate to disable or enable the pen and also to direct the transfer of data corresponding to the next pen position, as hereinafter described.

Either one of the FMTU or FMTD pen status control signals is transmitted through an OR gate 23 to the set (S) input of an R-S flip-flop 25. This causes flip-flop 25 to be conditioned in its true state, and a signal from its true (T) output is coupled through an inhibit gate 27 to the transfer control input of the data transfer gates 15. Inhibit gate 27 is a two input AND gate with one of its inputs inverted. This gate operates to block signals from flip-flop 25 under certain circumstances, as hereinafter described. The output signal from inhibit gate 27 initiates the transfer of a block of data from calculator 11 to the pen position control circuitry 17. After a block of data has been transferred, the data transfer gates 15 produce a transfer complete signal which performs three functions: (*a*) the pen position control circuit 17 is signalled to move the pen to the X-Y position corresponding to the data which was just transferred; (*b*) the calculator 11 is signalled to continue the internal processing of the next block of data to be transferred to the X-Y plotter; and (*c*) the flip-flop 25 is reset so that this flip-flop no longer produces a transfer control signal at its true output.

The signal lines corresponding to the pen status control signals FMTU and FMTD are also connected to the reset (R) and set (S) inputs of a flip-flop memory element 28. If an FMTU pen control signal is received by flip-flop 28, this flip-flop will be conditioned in its reset state so that a signal will appear at its false (F) output. The false output signal is coupled through an inhibit gate 29, hereinafter described, to the reset (R) input of a flip-flop memory element 31, the true (T) output of which is connected to drive the pen write control solenoid 19. When flip-flop 31 is reset by the false output from flip-flop 28, the output signal from the true output of flip-flop 31 is held low so that the pen is conditioned in its up or nonwriting position.

If an FMTD signal is received by a flip-flop 28, this flip-flop is set so that a signal appears at the true (T) output thereof. This true output is connected on one input of an AND gate 33. The other input to AND gate 33 is the transfer complete signal received from the data transfer gates 15 after a block of data has been transferred from the calculator 11 to the pen position control circuit 17. Thus AND gate 33 produces an output when an FMTD pen enabling control signal is stored by flip-flop 28 and after a block of data has been transferred. The output signal from AND gate 33 sets a flip-flop memory element 35 so that a signal is produced at the true (T) output thereof. The signal at this true output is coupled through a delay element 37 to an inhibit gate 39, and thence to the set (S) input of the pen solenoid driving flip-flop 31. At the same time that flip-flop 35 is set, the inhibit gate 39 is operated by circuitry hereinafter described to block signals from being received by flip-flop 31. The time delay produced by delay element 37 prevents a race condition between the two inputs to inhibit gate 39. Delay element 37 may be a conventional resistor-capacitor network which slows the transition time of the signal at the T output of flip-flop 35. In effect, flip-flop 35 stores the FMTD pen enabling control signal until such time as it is to be used to set flip-flop 31 and thus drive the pen write control solenoid 19 into the writing condition.

The three inhibit gates 27, 29, 39, each operate to block their respective input signals from being transmitted during the time that the pen of the X-Y plotter 13 is being moved in response to the X and Y data signals received from the pen position control circuit 17. A pen motion indicator 41 produces an inhibit pulse output signal whenever the pen is moving from one X-Y position to another. Motion indicator 41 may be a conventional threshold sense amplifier which monitors the input or output voltage levels of the servomechanisms in the pen driving circuit and produces the inhibit pulse signal whenever the servomechanisms are actuated. This inhibit signal is connected directly to the inhibit gate 39, and also is connected to the inhibit gates 27, 29 through a pulse-stretching circuit 43, which delays the trailing edge of the pulse signal from the pen motion indicator 41 by a predetermined time interval. During this time interval, after the pen has stopped moving, the data transfer control signal is inhibited by inhibit gate 27 and a signal from the false output of flip-flop 28 to the reset input of flip-flop 31 is inhibited by inhibit gate 29, so that flip-flop 31 may be set by the signal stored in flip-flop 35. This in turn causes a pen enabling signal to be produced at the true output of flip-flop 31, which in turn drives a solenoid 19 to condition the pen in a writing mode.

The overall operation of the system of FIG. 1 may be best understood by reference to the timing diagrams of FIGS. **2*a*–*k*. The sequence and time duration of operation for the various components in a system will be described for the exemplary case where a format down (FMTD) pen enabling signal is produced first and is thereafter followed by a format up (FMTU) pen disabling signal. It will be assumed that the pen is initially in a disabled or nonwriting mode at an X-Y position corresponding to the origin of the X-Y coordinate system. When an FMTD pen enabling signal is produced by the calculator 11, it is recognized by the decoding logic 21 (FIG. 2*a*), and it sets the data transfer control flip-flop 25 (FIG. 2*b*), so that the true output thereof goes high. Since the pen is not moving at this time, the signal from flip-flop 25 is transmitted by the inhibit gate 27 (FIG. 2*f*) to the gates 15 to thereby cause data to be transferred from the calculator 11 to the pen position control circuit 17. The time interval $T_1$ corresponds to the time during which data is being transferred. When the transfer of a block of data is complete, the data transfer gates 15 produce an output pulse (FIG. 2*g*) which resets the data transfer control flip-flop 25 so that the true output thereof goes low (FIG. 2*b*). The transfer complete pulse from the transfer gates 15 also signals the pen position control circuit 17 to initiate movement of the pen and signals the calculator 11** to continue processing data, as hereinafter described.

At the beginning of time interval $T_1$, the FMTD pen enabling signal also sets the flip-flop 28 (FIG. **2*c*), which controls the status of the pen after it is stopped moving, as will become apparent from the following description. The transfer complete signal from data transfer gates 15 (FIG. 2*g*) pulses the AND gate 33 (FIG. 2*j*) so that the signal from the true output of flip-flop 28 is transmitted to the set input of flip-flop 35 (FIG. 2*d*). Flip-flop 35** holds in memory the fact that the pen is to be enabled after it has stopped moving.

After a time interval $T_2$, the calculator 11 produces another pen control signal, for example the disabling signal FMTU (FIG. **2*a*). It is to be noted that during the time interval $T_2$, the pen is moving to an X-Y position under control of the block of data previously transferred to the pen position control circuit 17. Therefore, the outputs of the pen motion indicator 41 (FIG. 2*h*) and the pulse-stretching circuit 43 (FIG. 2*i*) go high and thus inhibit transmission of signals by the inhibits gates 27, 29, 39. The FMTU disabling signal again sets flip-flop 25 and also resets flip-flop 27, but the outputs therefrom are blocked by the inhibit gates 28, 29**.

Figure 2:
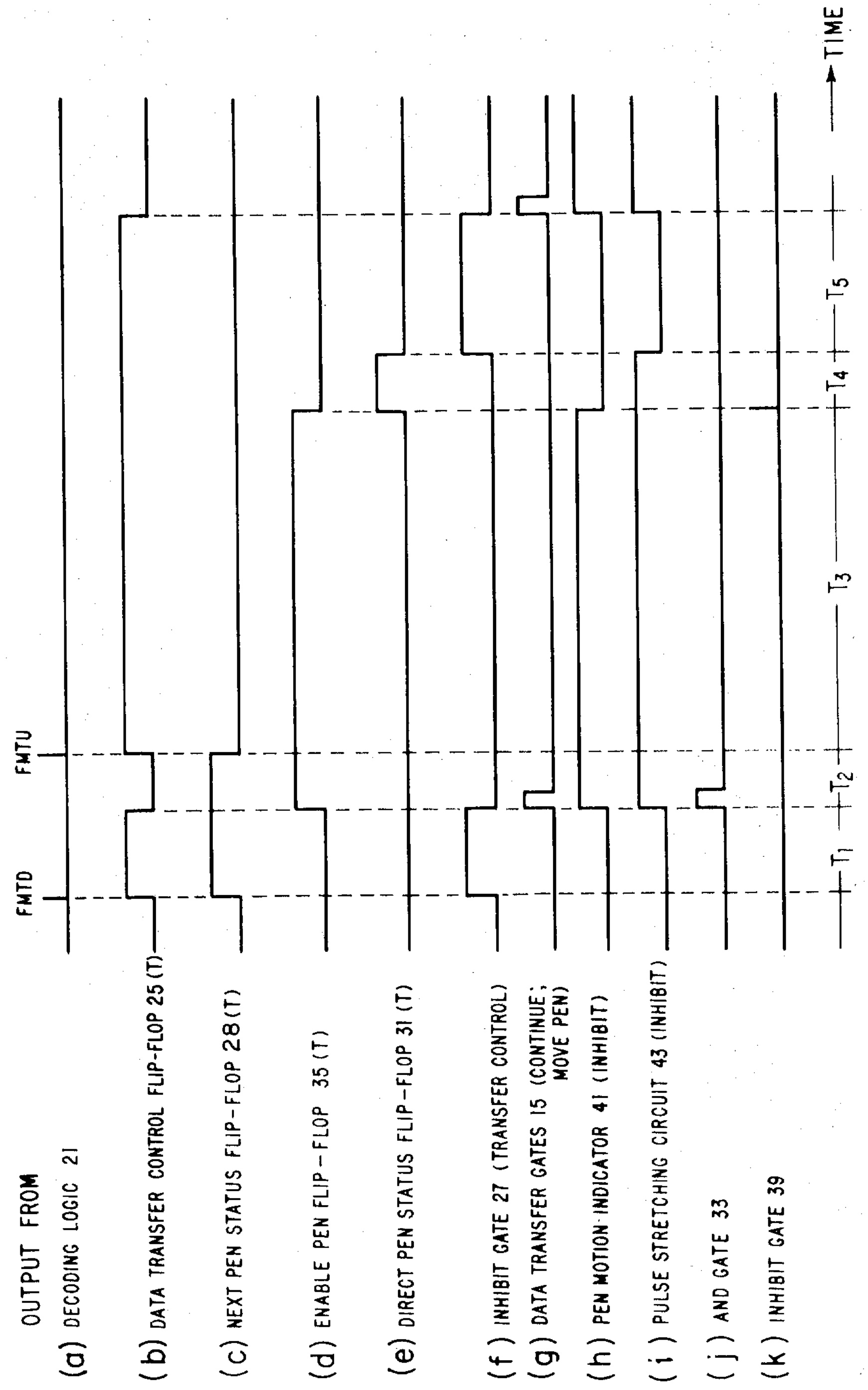

The time interval $T_3$, as shown in FIG. 2, corresponds to the time during which the pen is moving to a new coordinate position after the FMTU disabling signal is received by the flip-flop 28. After the pen has arrived at its new position, the output signal from the pen motion indicator 41 goes low (FIG. **2*h*). As a result, the inhibit gate 39 is immediately unblocked, and the output signal therefrom sets the flip-flop 31 (FIG. 2*e*), which in turn resets the flip-flop 35 (FIG. 2*d*). Since flip-flop 35 is reset immediately after inhibit gate 39 is unblocked, the output from inhibit gate 39 is a very short pulse (FIG. 2*k*). When flip-flop 31 is set, the true output thereof goes high (FIG. 2*e*) and directly controls the pen write solenoid 19** to condition the pen in a writing mode.

The pulse stretching circuit 43 may be a conventional monostable multivibrator circuit having a slow turnoff time. This circuit delays the trailing edge of the inhibit pulse from the pen motion indicator 41 by a predetermined time interval $T_4$. At the end of this time interval, the output of pulse stretching circuit 43 goes low (FIG. **2*i*), which in turn unblocks the inhibit gates 27, 29. This in turn permits the false output of flip-flop 28 to reset flip-flop 31 (FIG. 2*e*) and thus disable the pen by conditioning it in a nonwriting mode. Also, another transfer control signal is applied to the data transfer gates 15 by the inhibit gate 27 (FIG. 2*f*) and the next block of data is transferred to the X-Y plotter 13 from the calculator 11 during a time interval $T_5$. At the end of the time interval $T_5$, the data transfer gates 15 produce a transfer complete signal (FIG. 2*g***), which causes the pen to begin moving to a new X-Y position defined by the newly transferred block of data and also causes the calculator to continue processing the program in the above-described manner.

In the example of the system operation as described above, it can be seen that the pen started at the origin point of the coordinate system in a nonwriting mode and thereafter moved to a position defined by the X-Y data transferred from the calculator. The pen was then enabled in a writing mode during the time interval $T_4$, in response to the FMTD pen enabling signal. Thereafter, the pen was disabled in a nonwriting mode in response to the FMTU signal. As a result, a single point was plotted by the pen. It is to be noted that if the second pen control signal had been an FMTD signal, the true output of flip-flop 31 would remain high (FIG. 2e) and the pen would draw a continuous line segment to the next point defined by the X-Y data transferred from the calculator during the time interval $T_5$.

A main feature of the present invention is that plot control is achieved with only two control signals; namely, an FMTD enabling signal and an FMTU disabling signal. The functions of these two signals are apparent from the foregoing description. In summary, when an FMTU signal is recognized by the decoding logic 21, the pen is first disabled and is then moved to a position according to the data transferred to the pen position control circuit 17. Thereafter the pen remains disabled until an FMTD signal is produced by the calculator. Alternatively when an FMTD signal is recognized first, the pen retains its previous writing status, i.e., either enabled or disabled, and moves as directed by the X-Y data. After the move is completed, the pen becomes enabled, regardless of whether it was previously enabled or disabled, and it remains enabled until a subsequent pen control signal is received. If the pen was previously in a disabled, nonwriting mode, a point mark will be made at its new position; whereas if the pen was previously in an enabled, writing mode, a line will be drawn from the initial position to the new position. In response to either one of the two pen status control signals, a continue signal is transmitted to the calculator after the X-Y data has been transferred therefrom, so that the calculator may process data at the same time that the pen is moving to its new position. In FIG. 2, simultaneous data processing and pen movement occurs during the time interval $T_3$. If a pen enabling or disabling signal is received while the pen is moving, the execution thereof and the transfer of new data to the X-Y plotter 13 is delayed until a previously received pen control signal has been executed.

The illustrated embodiment of FIG. 1 also includes means for immediately disabling and zeroing the pen of the X-Y plotter 13. This feature may be used in the event that data received by the pen position control circuit 17 drives the pen to the limits of its travel in one or both of the X and Y axes. There is provided gating circuitry 45 which is responsive to a stop control signal generated by manual depression of a stop key on a keyboard, for example. Circuit 45 may be a conventional diode gating circuit having a single input and a plurality of outputs which are electrically isolated from one another. When a stop control signal is produced, the gating circuit 45 resets each of the flip-flops 25, 28, 31, 35 and also signals a zero-set input to the pen position control circuit 17. The resetting of the four flip-flops conditions the pen in a disabled, nonwriting mode, and the zero-set signal causes the pen to be returned to the origin of the X-Y plot.

I claim:

1. In the combination including a cyclically operable digital calculator and an X-Y plotter having a positionable writing stylus, a system for controlling said writing stylus comprising:
   - means for controlling the X-Y position of said writing stylus;
   - gating means for selectively transferring data from said calculator to said stylus position controlling means;
   - decoding means for providing first and second plot control signals in response to predetermined signals from said calculator;
   - means responsive to either one of said first and second plot control signals from said decoding means for controlling said gating means to transfer a block of data to said st stylus position controlling means;
   - memory means coupled to said decoding means for holding one of said first and second plot control signals in storage until the next plot control signal is provided by said decoding means; and
   - means for enabling said stylus into a writing mode in response to said first plot control signal from said memory means after said stylus has been caused to move to an X-Y position determined by said block of data transferred to said X-Y position controlling means, and for disabling said stylus into a nonwriting mode in response to said second plot control signal from said memory means whenever said stylus is not moving.

2. The system of claim 1, wherein:
   - said gating means includes means providing a transfer signal after a block of data has been transferred from said calculator to said stylus position controlling means;
   - said enabling and disabling means includes:
     - first gating means for providing a stylus enabling signal in response to the coincident occurrence of said transfer signal and said first plot control signal from said memory means;
     - second gating means for providing a stylus disabling signal in response to said second plot control signal from said memory means;
     - memory means for holding said stylus enabling signal from said first gating means in storage while said stylus is being moved in response to signals from said X-Y stylus position controlling means;
     - means for transmitting said stylus enabling signal from said last named memory means and said stylus disabling signal from said second gating means to said stylus controlling means.

3. The system of claim 2, further including means for inhibiting said stylus enabling and disabling signals during the time interval that said stylus is moving under control of said X-Y stylus position controlling means.

4. The system of claim 2, further including electromechanical transducer means for driving said stylus into a writing or a nonwriting condition; and wherein said means for transmitting said stylus enabling and disabling signals includes bistable means having first and second output states for controlling said electromechanical transducing means to maintain said stylus in said writing or nonwriting condition, respectively, said first output state being operable in response to the enabling signal from said memory means of said enabling and disabling means, and said second state being operable in response to the disabling signal from said second gating means.

5. In the combination including a cyclically operable digital calculator and an X-Y plotter having a positionable pen, a system for controlling the various writing status of said pen comprising:
   - means for controlling the X-Y position of said pen;
   - means for gating data from said calculator to said pen position controlling means;
   - decoding means responsive to first and second predetermined code signals from said calculator for providing first and second pen write control signals respectively;
   - means responsive to either one of said first and second pen write control signals for controlling said gating means to transfer a block of data to said pen position controlling means;
   - first memory means for storing said first and second pen write control signals as they are received from said decoding means;
   - second memory means responsive to said first memory means for storing said first pen write control signal after a block of data has been transferred from said calculator to said pen position controlling means;
   - third memory means for maintaining said pen in an enabled or a disabled condition in response to said first pen write control signal from said second memory means or to said second pen write control signal from said first memory means, respectively; and
   - means for inhibiting reception of said first or second pen write control signals by said third memory means when said pen is moving in response to X-Y signals from said pen position controlling means.

6. The system of claim 5, wherein:

said gating means includes means for indicating when a block of data has been transferred to said pen position controlling means;

said first memory means includes a flip-flop having complementary set and reset states corresponding respectively to said first and second pen write control signals;

said second memory means includes:

a flip-flop having set and reset states;

means responsive to the coincident occurrence of signals from said indicating means and said set state of said first name flip-flop for setting said last named flip-flop to its set state; and said third memory means includes a flip-flop operable in a set state in response to signals from the flip-flop of said second memory means, and operable in a reset state in response to the reset state of the flip-flop of said first memory means.

7. The system of claim 6, wherein said means for controlling said gating means includes a flip-flop which is operable in a set state while a block of data is being transferred from said calculator to said pen position controlling means, and operable in a reset state when no data is being transferred to said pen position controlling means.

8. The system of claim 7 further including stopping means responsive to a stop signal for disabling said pen.

9. The system of claim 8, wherein said stopping means includes:

means for conditioning each and every one of said flip-flops in its reset state; and means coupled to said pen position controlling means for returning said pen to a predetermined zero origin position.

UNITED STATES PATENT OFFICE
CERTIFICATE OF CORRECTION

Patent No. 3,602,890 Dated August 31, 1971

Inventor(s) Robert W. Colpitts

It is certified that error appears in the above-identified patent and that said Letters Patent are hereby corrected as shown below:

Column 1, line 18, "drawn" should read -- draw --;

Column 2, lines 46-47, "coupled to the pen, which when energized," should read -- coupled to the pen. When energized, --;

Column 3, line 22, "on" should read -- to --;

Column 4, line 38, "flip-flop 27" should read -- flip-flop 28 --; line 39, "inhibit gates 28, 29" should read -- inhibit gates 27, 29 --;

Column 5, line 70, delete "st";

Column 6, line 48, delete "various".

Signed and sealed this 29th day of February 1972.

(SEAL)
Attest:

EDWARD M.FLETCHER,JR. ROBERT GOTTSCHALK
Attesting Officer Commissioner of Patents